United States Patent
Yao et al.

(10) Patent No.: US 11,300,183 B2
(45) Date of Patent: Apr. 12, 2022

(54) STRUCTURE OF SPEED CHANGER

(71) Applicant: Li-Ho Yao, Taipei (TW)

(72) Inventors: Li-Ho Yao, Taipei (TW); Norman Lien, Taipei (TW); Chi-Chen Tien, Taipei (TW); Pei-Sheng Hsieh, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/335,028

(22) Filed: May 31, 2021

(65) Prior Publication Data

US 2021/0381583 A1    Dec. 9, 2021

(30) Foreign Application Priority Data

Jun. 9, 2020   (TW) .................................. 109119329

(51) Int. Cl.
  *F16H 3/64*    (2006.01)
(52) U.S. Cl.
  CPC ....... *F16H 3/64* (2013.01); *F16H 2200/0039* (2013.01); *F16H 2200/201* (2013.01); *F16H 2200/2035* (2013.01)
(58) Field of Classification Search
  CPC ......................... F16H 2200/2035–2061; F16H 2200/2007–2028; F16H 3/62; F16H 3/66
  See application file for complete search history.

(56) References Cited

U.S. PATENT DOCUMENTS

| 4,653,347 | A | * | 3/1987 | Hiraiwa | .................... F16H 3/66 |
| | | | | | 475/281 |
| 2017/0009874 | A1 | * | 1/2017 | Thomas | .................... F16H 1/36 |
| 2017/0203646 | A1 | * | 7/2017 | Mueller | ............... B60W 10/113 |

* cited by examiner

*Primary Examiner* — Ernesto A Suarez
*Assistant Examiner* — Lillian T Nguyen
(74) *Attorney, Agent, or Firm* — Leong C. Lei

(57) ABSTRACT

A speed changer includes a transmitting mechanism and at least one speed-increasing mechanism. The transmitting mechanism includes a primary sun gear mounted by a one-way bearing a fixed shaft. The primary sun gear is in mesh engagement with primary planetary gears rotatably mounted to an output frame and in mesh engagement with an inner circumference of a toothed ring. The speed-increasing mechanism is rotatably mounted by a tubular shaft to the fixed shaft. The tubular shaft is provided with a sun gear having a diameter smaller than the primary sun gear. Planetary gears in mesh engagement with the sun gear are rotatably mounted on the output frame and are combined with and synchronously rotatable with the primary planetary gears. The tubular shaft of the speed-increasing mechanism is provided with an arresting assembly to selectively stop rotation of the tubular shaft.

12 Claims, 7 Drawing Sheets

STRUCTURE OF SPEED CHANGER

TECHNICAL FIELD OF THE INVENTION

The present invention relates to a speed changer, such as a gearbox.

DESCRIPTION OF THE PRIOR ART

A speed change mechanism is constructed to provide different gear ratios between a driving source and a driven member by means of a combination of gears of different sizes, in order to achieve change of speed. For a speed change mechanism that is used in an electrical vehicle, the driving source is primarily an electric motor, and thus, the change of speed for such a speed change mechanism is generally based on at least two clutches arranged on a driving shaft to respectively operate transmission rollers of different gear ratios to drive the driven member. Such clutches are made up of a clutching assembly and an actuating assembly that operates the clutching assembly. The clutching assembly comprises a plurality of clamping plates that are connected to the driving shaft and a plurality of clamping plates that are connected to the transmission wheels arranged in a manner of being alternately stacked, and such clamping plates are operated by the actuating assembly to be tightly clamped together or to separate from each other.

However, for such known speed change mechanisms that rely on clutches to achieve change of speed, the clutches require electronic elements and electrical wires arranged in the interior thereof. This complicates the structure and makes the overall size expanded and bulky. Further, the forces of the clutches are primarily provided by electromagnetic forces, which utilizes frictional forces to achieve connecting of a static member and a rotating member, and thus suffering an extremely large kinetic loss and making it hard to establish power transmission. Further, there is a window interval of discontinuity of power during the change of speed, and interruption easily occurs during the course of speed change. Thus, the known speed change mechanism suffers insufficiency of reliability, promptness, and confirmedness in practical applications.

SUMMARY OF THE INVENTION

The primary objective of the present invention is to fast establish power transmission by means of constraining forces so as to cause no kinetic loss and also to improve operation confirmedness, efficiency, and reliability.

Another primary objective of the present invention is to simplify the structure, reduce the rate of failure, and effectively lower down the size and fabrication cost.

A further primary objective of the present invention is to enable direct and efficient power handover in speed change during synchronous operation so as to accelerate change of speed.

A further primary objective of the present invention is to enable direct action of power transmission, making response fast, so as not to cause interruption resulting from a static piece clamping a rotating piece of a clutch occurring in the prior art and improve smoothness of speed change.

DETAILED DESCRIPTION OF THE PREFERRED EMBODIMENT

Figure 1:
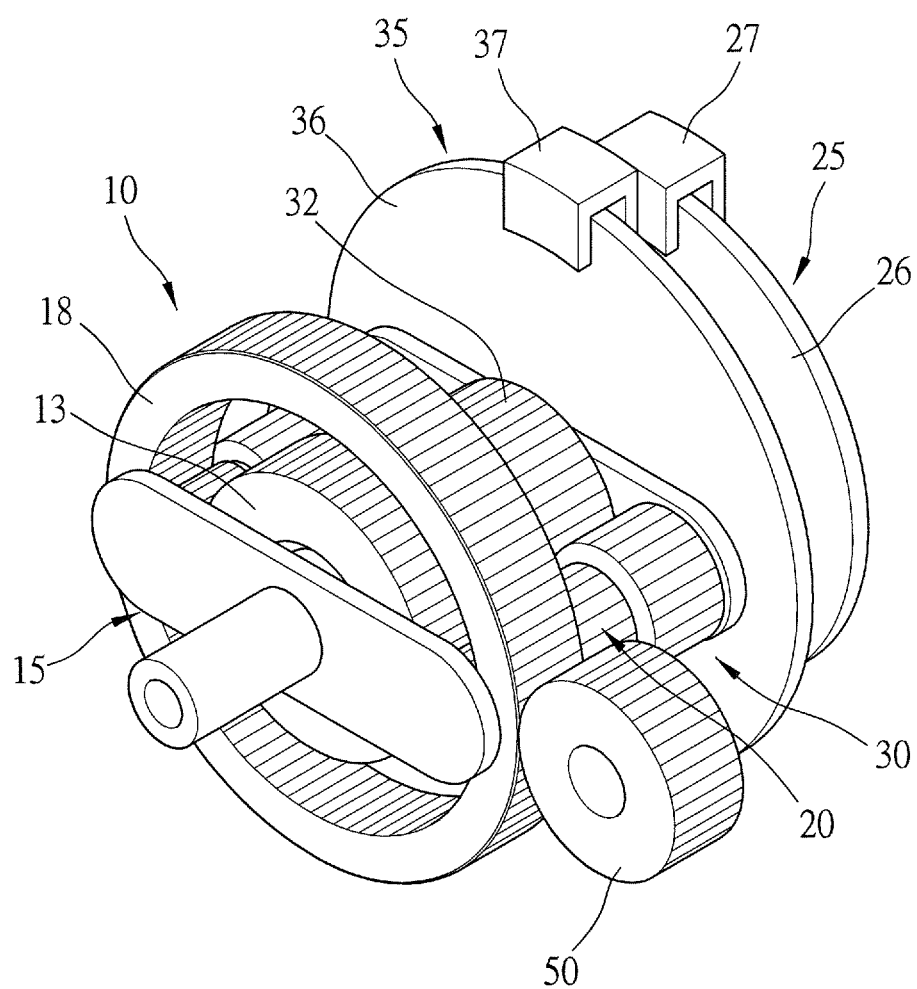
FIG. 1 is a perspective view of the present invention.
Figure 2:
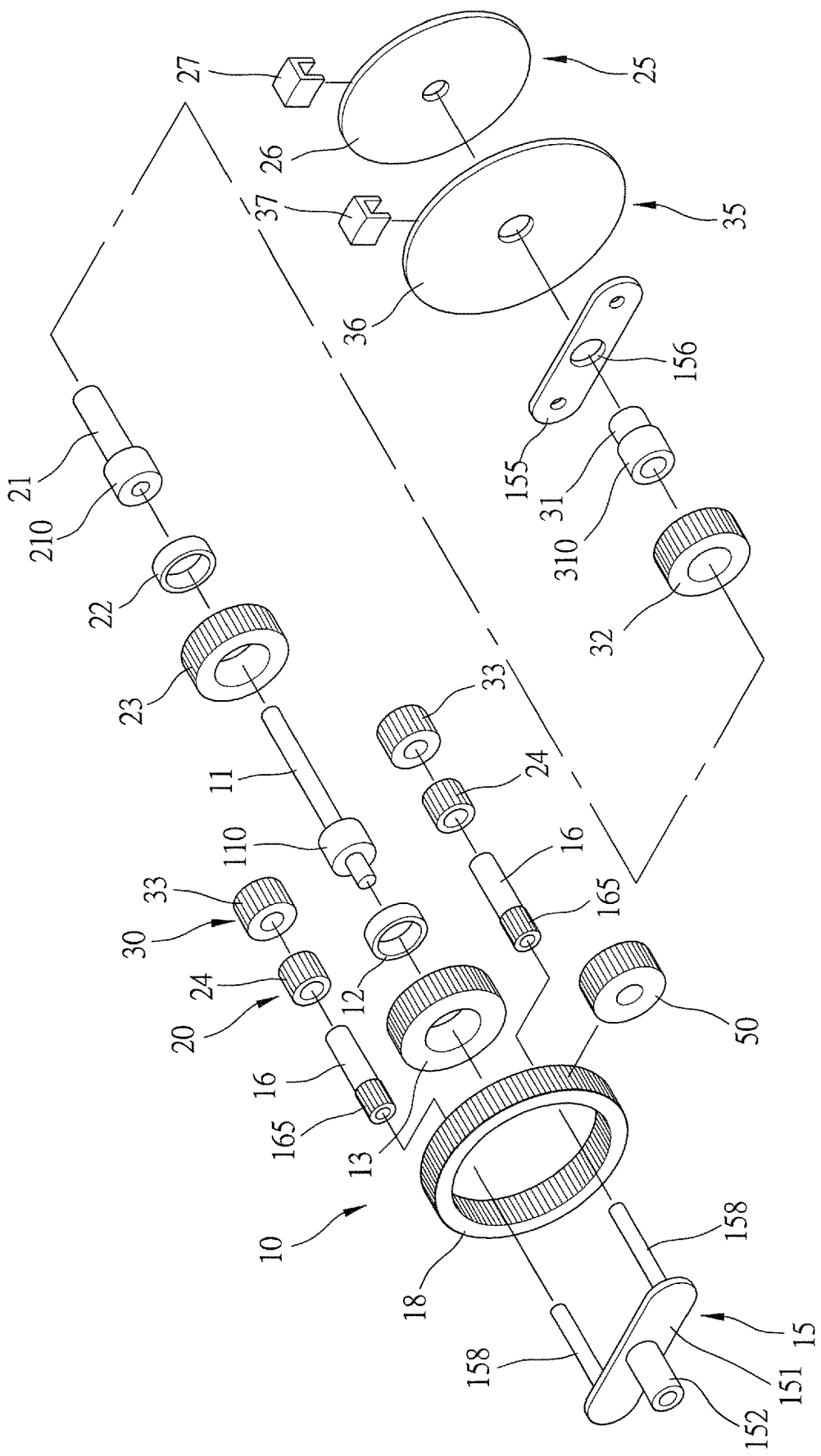
FIG. 2 is an exploded view of the present invention.

The present invention is constructed, as shown in FIGS. 1 and 2, as a structure comprising a transmitting mechanism 10 and at least one speed-increasing mechanism 20, 30, in which a driving wheel 50 that is operated with a power source drives the transmitting mechanism 10 to generate an output, wherein increase of speed is realized with the speed-increasing mechanism 20, 30. According to some embodiments, the present invention may comprise two speed-increasing mechanisms 20, 30, which are respectively referred to as a first speed-increasing mechanism 20 and a second speed-increasing mechanism 30, such that the present invention includes an initial position of the transmitting mechanism 10, a first speed-increased position of the first speed-increasing mechanism 20, and a second speed-increased position of the second speed-increasing mechanism 30, wherein a speed of the second speed-increased position is greater than a speed of the first speed-increased position and the speed of the first speed-increased position is greater than a speed of the initial position.

Figure 3:
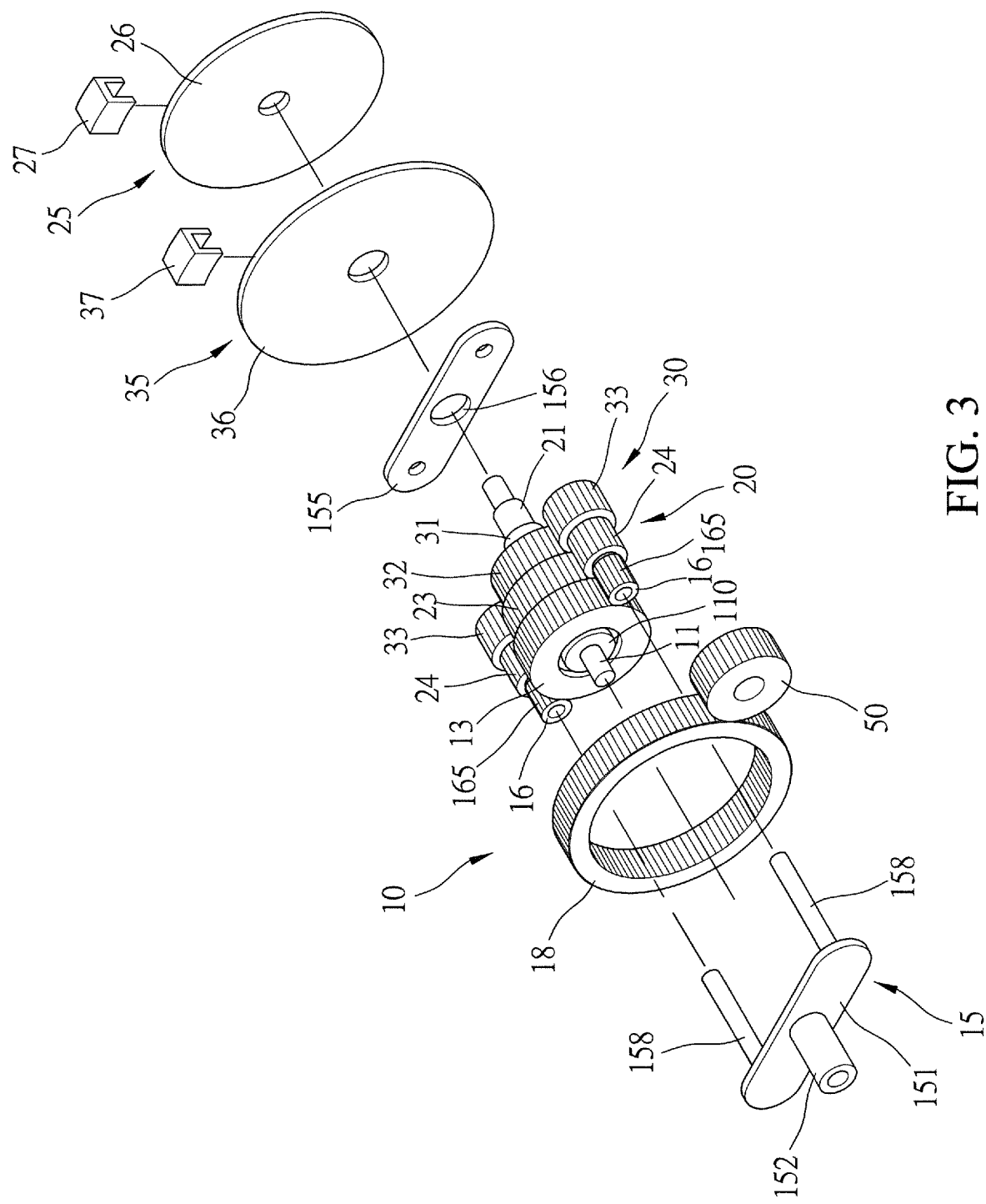
FIG. 3 is an exploded view showing the present invention in a partly assembled form.
Figure 4:
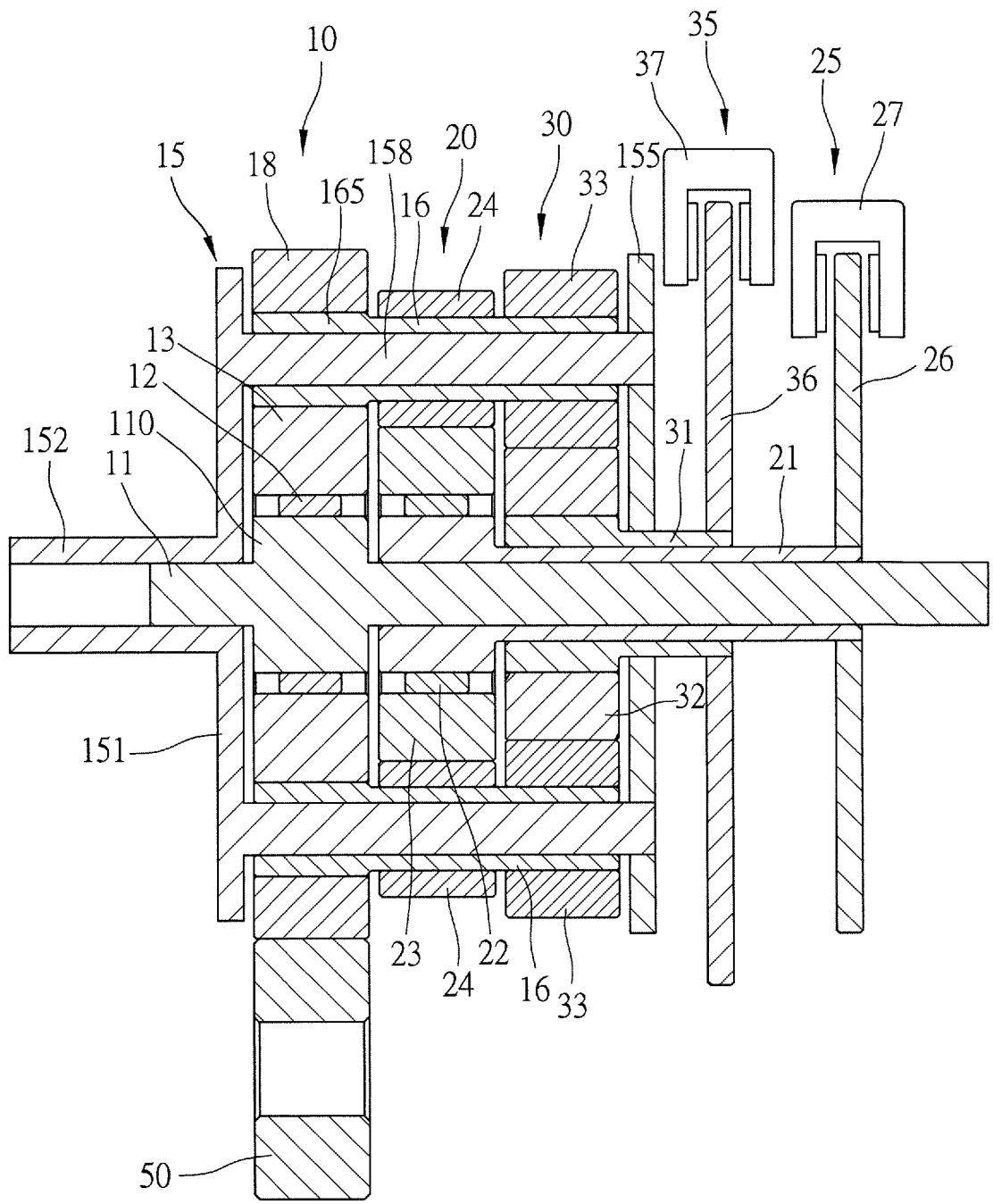
FIG. 4 is a side elevational view, in a sectioned form, showing the present invention.

For details of the structure of the present invention, reference is made to FIGS. 2, 3, and 4. The transmitting mechanism 10 comprises a fixed shaft 11, an output frame 15, and a toothed ring 18 having inner and outer circumferences that are both formed as toothed surfaces, wherein the fixed shaft 11 is provided for receiving the first and second speed-increasing mechanisms 20, 30 to assemble therewith and the fixed shaft 11 comprises an expanded shaft portion 110, such that the expanded shaft portion 110 of the fixed shaft 11 receives a primary sun gear 13 to mount thereto by means of a one-way bearing 12. The one-way bearing 12 provides the primary sun gear 13 with an effect of idling in a direction opposite to a rotation direction of the driving wheel 50 (for example, the driving wheel being rotated in a counterclockwise direction and the primary sun gear being in idle rotation in a clockwise direction, but fixed in an opposite direction). Further, the output frame 15 is formed of a front plate 151, a rear plate 155, and at least two bars 158 that are connected between the front and rear plates 151, 155 in a manner of being parallel with the fixed shaft 11 and are equally angularly spaced from each other, wherein the front plate 151 is provided, at a center thereof, with a tubular output axle 152 that corresponds to and is rotatably mounted to an end of the fixed shaft 11, and the rear plate 155 is formed with a through hole 156 through which an opposite end of the fixed shaft 11 extends; and the front and rear plates 151, 155 of the output frame 15 are spaced from each other by a spacing distance that is sufficient to accommodate the transmitting mechanism 10 and each of the speed-increasing mechanisms 20, 30, and an outside diameter of a circle defined by the bars 158 of the output frame 15 is smaller than an inside diameter of the toothed ring 18. Further, each of the bars 158 of the output frame 15 receives a bar sleeve 16 rotatably mounted thereto and the bar sleeve 16 has an end that corresponds to the toothed ring 18 and is formed with a primary planetary gear 165. The primary planetary gear 165 of each of the bars 158 of the output frame 15 is in mesh engagement with the inner circumference of the toothed ring 18, and the outer circumference of the toothed ring 18 is in mesh engagement with the driving wheel 50.

The first speed-increasing mechanism 20 comprises a first tubular shaft 21, a first sun gear 23, at least two first planetary gears 24, and a first arresting assembly 25. The first tubular shaft 21 is rotatably fit to and sleeved over the fixed shaft 11, and the first tubular shaft 21 is provided, at an end thereof, with an expanded shaft portion 210 that is adjacent to the expanded shaft portion 110 of the fixed shaft 11, such that the expanded shaft portion 210 of the first tubular shaft 21 receives a first sun gear 23 to mount thereto by means of a one-way bearing 22. The one-way bearing 22 provides the first sun gear 23 with an effect of idling in a direction opposite to a rotation direction of the driving wheel 50 (for example, the driving wheel being rotated in a counterclockwise direction and the first sun gear being in idle rotation in a clockwise direction, but fixed in an opposite direction). Further, an outside diameter of the first sun gear 23 is smaller than that of the primary sun gear 13. The first planetary gears 24 are fixedly mounted to the bar sleeves 16 of the output frame 15, respectively, such that the first planetary gears 24 are rotatable in synchronization with rotation of the primary planetary gears 165 of the transmitting mechanism 10, and each of the first planetary gears 24 is in mesh engagement with the first sun gear 23. A gear ratio between the primary sun gear 13 and the primary planetary gears 165 of the transmitting mechanism 10 is greater than a gear ratio between the first sun gear 23 and the first planetary gears 24 of the first speed-increasing mechanism 20, so that the first speed-increasing mechanism 20 provides an effect of increasing an output speed of the transmitting mechanism 10. Further, the first arresting assembly 25 is mounted to an opposite end of the first tubular shaft 21 and is operable to selectively stop rotation of the first tubular shaft 21. In the present invention, the first arresting assembly 25 comprises a disc 26 fixedly mounted to the end of the first tubular shaft 21. A stop piece 27 is arranged along a circumference of the disc 26 to selectively arrest and stop rotation of the disc 26, wherein the stop piece 27 can be one of a caliper, an electromagnetic device, and a brake lining.

The second speed-increasing mechanism 30 comprises a second tubular shaft 31, a second sun gear 32, at least two second planetary gears 33, and a second arresting assembly 35. The second tubular shaft 31 is rotatably fit to and sleeved over the first tubular shaft 21 of the first speed-increasing mechanism 20, and the second tubular shaft 31 is provided, at an end thereof, with an expanded shaft portion 310 that is adjacent to the expanded shaft portion 210 of the first tubular shaft 21, such that the expanded shaft portion 310 of the second tubular shaft 31 receives a second sun gear 32 to mount thereto. An outside diameter of the second sun gear 32 is smaller than that of the first sun gear 23. The second planetary gears 33 are fixedly mounted to the bar sleeves 16 of the output frame 15 at one side of the first planetary gears 24 that is opposite to the primary planetary gears 165, such that the second planetary gears 33 are rotatable in synchronization with the primary planetary gears 165 and the first planetary gears 24 that are adjacent thereto and each of the second planetary gears 33 is in mesh engagement with the second sun gear 32. The gear ratio between the first sun gear 23 and the first planetary gears 24 of the first speed-increasing mechanism 20 is greater than a gear ratio of the second sun gear 32 and the second planetary gears 33 of the second speed-increasing mechanism 30, so that the second speed-increasing mechanism 30 provides an effect of increasing the output speeds of the transmitting mechanism 10 and the first speed-increasing mechanism 20. Further, the second arresting assembly 35 is mounted to an opposite end of the second tubular shaft 31 and is operable to selectively stop rotation of the second tubular shaft 31. In the present invention, the second arresting assembly 35 comprises a disc 36 fixedly mounted to the end the second tubular shaft 31. A stop piece 37 is arranged along a circumference of the disc 36 to selectively arrest and stop rotation of the disc 36, wherein the stop piece 37 can be one of a caliper, an electromagnetic device, and a brake lining.

As such, output can be generated by driving the transmitting mechanism 10, and a speed of the output of the transmitting mechanism 10 can be increased by means of the first speed-increasing mechanism 20 or the second speed-increasing mechanism 30, so as to provide a structure of a speed changer.

Figure 5:
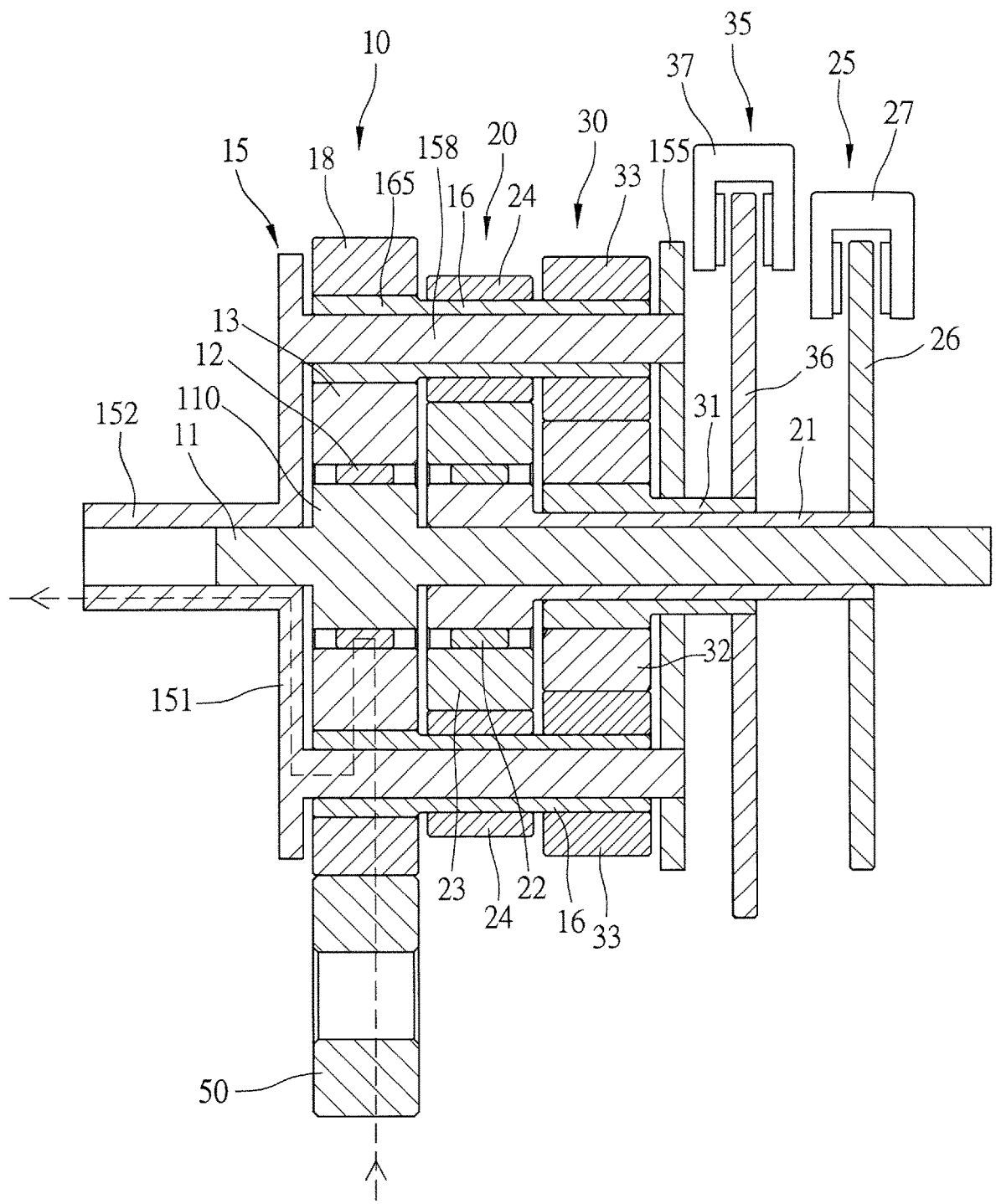
FIG. 5 is a schematic view illustrating the present invention in an initial position.

Operation of the present invention is such that, as shown in FIGS. 1 and 5, for driving at an initial position, the first and second arresting assemblies 25, 35 of the first and second speed-increasing mechanisms 20, 30 are released first, so that when the driving wheel 50 rotates counterclockwise, as being driven in reverse direction, to drive the toothed ring 18 of the transmitting mechanism 10, the toothed ring 18 is caused to rotate in a forward direction, and driving, in the forward direction, rotation of the primary planetary gears 165 of the output frame 15, so that the primary sun gear 13 that is in mesh engagement with the primary planetary gears 165 is provided with an operating force for rotating in the reverse direction. Due to the primary sun gear 13 being mounted to the fixed shaft 11 by means of the one-way bearing 12 that is operable in the reverse direction, the primary sun gear 13 is not caused to rotate, and the primary planetary gears 165 of the output frame 15 are forced to clockwise rotate relative to the primary sun gear 13 in the forward direction, such that an output is generated at the tubular output axle 152 of the output frame 15. Meanwhile, since the first and second sun gears 23, 32 of the first and second speed-increasing mechanisms 20, 30 are not constrained, the first and second sun gears 23, 32 are respectively driven by the first and second planetary gears 24, 33 mounted on the output frame 15 to do idle rotation relative to the fixed shaft 11 by means of the first and second tubular shafts 21, 31.

Figure 6:
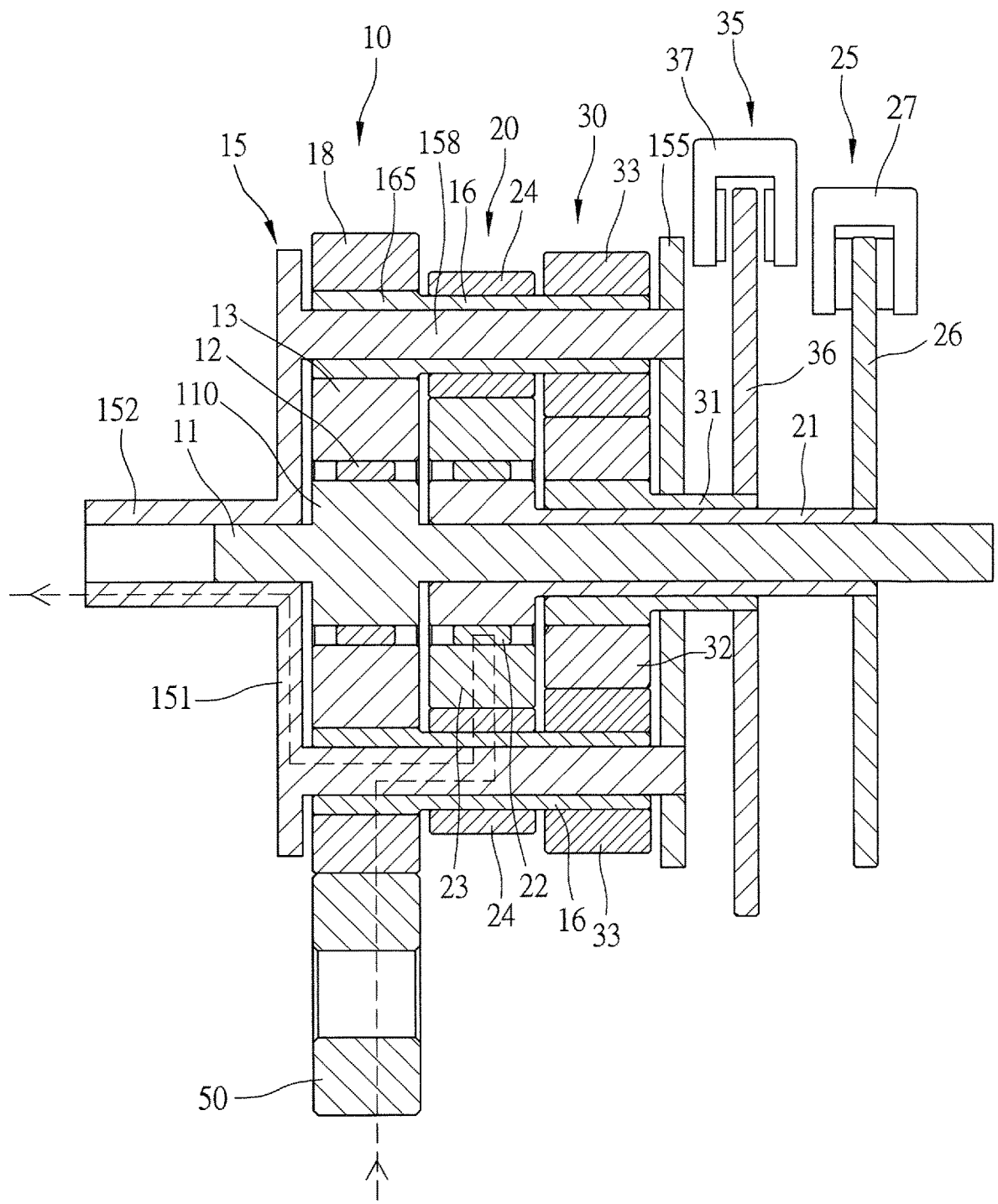
FIG. 6 is a schematic view illustrating the present invention changing to a first speed-increased position.

In need of speed change, such as changing speed from the initial position to the first speed-increased position, as shown in FIGS. 1 and 6, the second arresting assembly 35 of the second speed-increasing mechanism 30 is released such that no constraint is made to the second tubular shaft 31 of the second speed-increasing mechanism 30 in respect of rotation thereof, and the first arresting assembly 25 of the first speed-increasing mechanism 20 is put in operation to have the stop piece 27 clamp and arrest the disc 26, such that the first tubular shaft 21 of the first speed-increasing mechanism 20 is constrained from rotation, and the first tubular shaft 21 and the first sun gear 23 are simultaneously prevented from rotation. In this way, the first speed-increasing mechanism 20 is being in operation such that the first planetary gears 24 mounted on the output frame 15 are rotated, in the forward direction, relative to the first sun gear 23, wherein since the gear ratio of the first speed-increasing mechanism 20 is smaller than the gear ratio of the transmitting mechanism 10, the output speed of the output frame 15 is increased. Further, since the second sun gear 32 of the second speed-increasing mechanism 30 is not constrained, the second sun gear 32 is driven by the second planetary gears 33 mounted on the output frame 15, and is set in idle rotation relative to the first tubular shaft 21 by means of the second tubular shaft 31. Further, the primary planetary gears 165 of the transmitting mechanism 10 are driven by the output frame 15 of which the speed has been increased, so that the primary sun gear 13 that is in mesh engagement therewith is also increased in speed, wherein the primary sun gear 13 achieves an effect of idling in the reversed direction relative to the fixed shaft 11 by means of the one-way bearing 12 so as not to cause interference.

Figure 7:
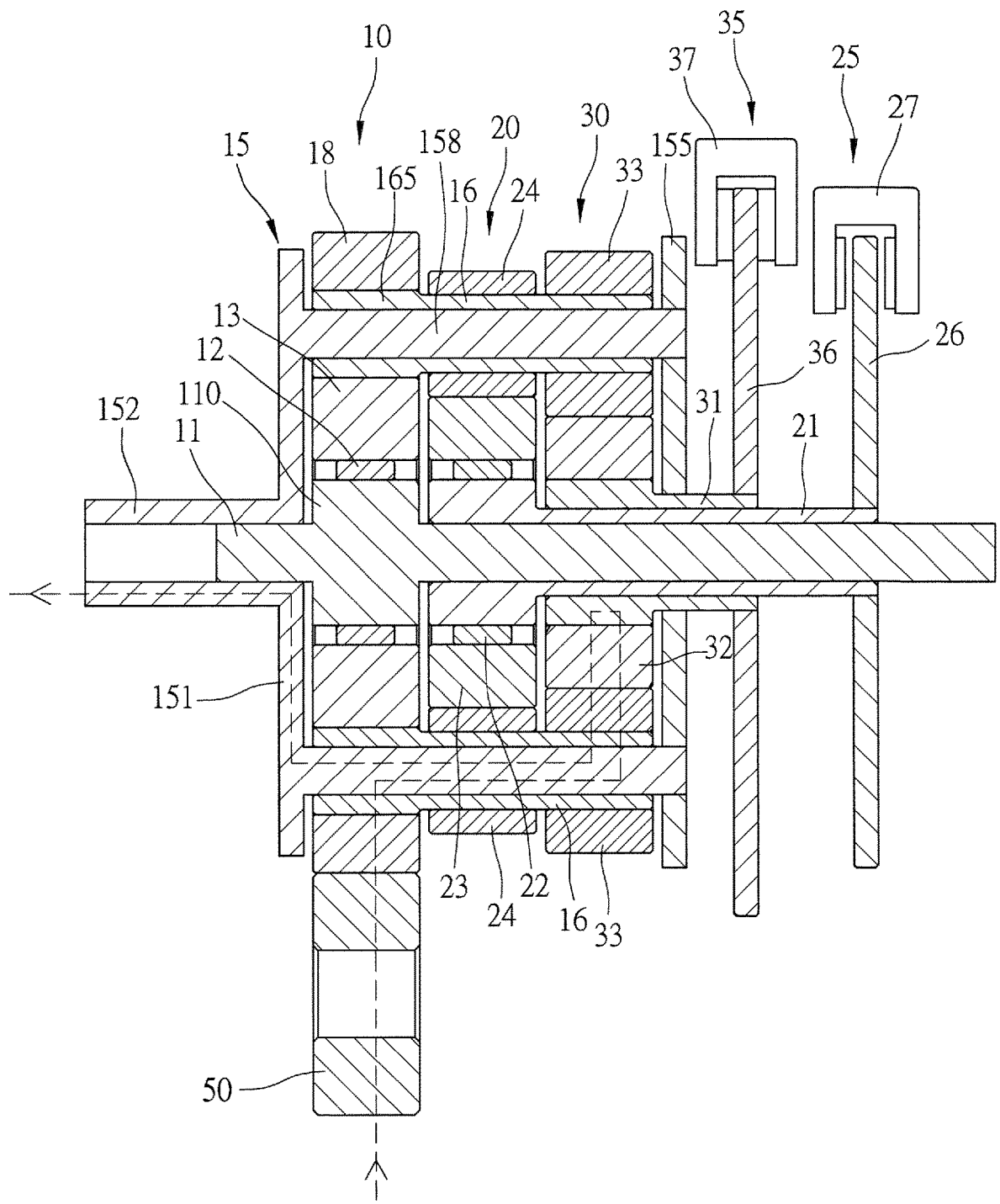
FIG. 7 is a schematic view illustrating the present invention changing to a second speed-increased position.

In need of speed change, such as changing speed from the initial position or the first speed-increased position to the second speed-increased position, as shown in FIGS. 1 and 7, the first arresting assembly 25 of the first speed-increasing mechanism 20 is released such that no constraint is made to the first tubular shaft 21 of the first speed-increasing mechanism 20 in respect of rotation thereof, and the second arresting assembly 35 of the second speed-increasing mechanism 30 is put in operation to have the stop piece 37 clamp and arrest the disc 36, such that the second tubular shaft 31 of the second speed-increasing mechanism 30 is constrained from rotation, and the second tubular shaft 31 and the second sun gear 32 are simultaneously prevented from rotation. In this way, the second speed-increasing mechanism 30 is being in operation such that the second planetary gears 33 mounted on the output frame 15 are rotated, in the forward direction, relative to the second sun gear 32, wherein since the gear ratio of the second speed-increasing mechanism 30 is smaller than the gear ratio of the transmitting mechanism 10 or that of the first speed-increasing mechanism 20, the output speed of the output frame 15 is increased. Further, since the first sun gear 23 of the first speed-increasing mechanism 20 is not constrained, the first sun gear 23 is driven by the first planetary gears 24 mounted on the output frame 15 so as to drive the first sun gear 23 in mesh engagement therewith to increase speed, wherein the first sun gear 23 achieves an effect of idling in the reversed direction relative to the first tubular shaft 21 by means of the one-way bearing 22 so as not to cause interference. Further, since the primary planetary gears 165 of the transmitting mechanism 10 are driven by the output frame 15 of which the speed has been increased, so that the primary sun gear 13 that is in mesh engagement therewith is also increased in speed, wherein the primary sun gear 13 achieves an effect of idling in the reversed direction relative to the fixed shaft 11 by means of the one-way bearing 12 so as not to cause interference.

With the arrangement and illustration provided above, the present invention is structured such that the primary sun gear 13 of the transmitting mechanism 10 is mounted by means of the one-way bearing 12 to the fixed shaft 11, and the primary planetary gears 165 that are mounted on the output frame 15 are in mesh engagement with both the primary sun gear 13 and the toothed ring 18, wherein when the toothed ring 18 is being driven, the purpose of speed change can be achieved by means of the gear ratios among the toothed ring 18, the primary planetary gears 165, and the primary sun gear 13, and an output is made through the output frame 15, and wherein the first and second planetary gears 24, 33 of the first and second speed-increasing mechanisms 20, 30 are driven in such a way that the first and second sun gears 23, 32 are selectively stopped by means of the first and second arresting assemblies 25, 35, respectively, to achieve the purpose of speed increasing from the initial position to the first speed-increased position or the second speed-increased position. The following advantages are achieved:

(1) In change of speed according to the present invention, the first and second arresting assemblies 25, 35 are selectively operated to constrain the rotations of the first and second tubular shafts 21, 31 to prevent the operations of the first and second sun gears 23, 32 so as to allow the first and second planetary gears 24, 33 to drive the output frame 15 to rotate to increase speed, wherein constraining forces of the primary sun gear 13 and the first and second sun gears 23, 32 allow transmission of power to be efficiently established, without causing kinetic loss resulting from operation based on frictional force as commonly adopted in the prior art, so that the present invention is effective in improving operation confirmedness and reliability.

(2) In the present invention, the first and second speed-increasing mechanisms 20, 30 utilize coupling between the first and second planetary gears 24, 33 and the corresponding first and second sun gears 23, 32 to perform speed change and this, compared to the prior art clutch-based speed changing structures, provides a simplified structure, having a lower rate of failure, and effectively reducing the size and fabrication cost.

(3) In the present invention, the first and second speed-increasing mechanisms 20, 30 and the transmitting mechanism 10 are synchronously set in rotation, so that during change of speed, power can be immediately connected, achieving fast change of speed and showing no window interval.

(4) In the present invention, the first and second speed-increasing mechanisms 20, 30 utilize the first and second arresting assemblies 25, 35 to respectively stop the rotations of the first and second sun gears 23, 32, so that during change of speed, interruption resulting from a static piece clamping a rotating piece of a clutch occurring in the prior art is not generated, so as to improve smoothness of speed change.

We claim:
1. A speed changer structure, comprising:
a transmitting mechanism, which comprises a fixed shaft, an output frame, and a toothed ring, wherein a primary sun gear is mounted by means of a one-way bearing to the fixed shaft, and the output frame is rotatably mounted to an end of the fixed shaft, the output frame comprising at least two bars that are parallel to the fixed shaft and jointly define a circle having a diameter that is smaller than an inside diameter of the toothed ring, each of the bars of the output frame being provided with a primary planetary gear rotatably mounted thereto and in mesh engagement with an inner circumference of the toothed ring, the toothed ring having an outer circumference in mesh engagement with a driving wheel; and
at least one speed-increasing mechanism, which comprises a tubular shaft, a sun gear, at least two planetary gears, and an arresting assembly, wherein the tubular shaft is rotatably mounted to the fixed shaft, and the sun gear is mounted to the tubular shaft, the sun gear having an outside diameter that is smaller than an outside diameter of the primary sun gear, the planetary gears being respectively and rotatably mounted to the bars of the output frame, the planetary gears being respectively combined with the primary planetary gears to be synchronously rotatable with each other, the planetary gears being in mesh engagement with the sun gear, the arresting assembly being mounted to an opposite end of the tubular shaft to selectively stop rotation of the tubular shaft;

wherein the driving wheel is driven by a power source and is in mesh engagement with the outer circumference of the toothed ring of the transmitting mechanism to generate an output at the output frame, and an effect of increasing speed is achievable through the arresting assembly of the speed-increasing mechanism fixing the tubular shaft.

2. The speed changer structure according to claim 1, wherein the at least one speed-increasing mechanism comprises two or more speed-increasing mechanisms, wherein from one of the speed-increasing mechanisms that is adjacent to the transmitting mechanism to an outermost one of speed-increasing mechanisms, the outside diameters of the sun gears are reduced from a large one to a small one, wherein the sun gear of one of speed-increasing mechanisms that is not the outermost one of the speed-increasing mechanisms is mounted by a one-way bearing to a corresponding one of the tubular shafts, and from the one of the speed-increasing mechanisms that is adjacent to the transmitting mechanism to the outermost one of speed-increasing mechanisms, the tubular shafts are rotatably and sequentially mounted on the fixed shaft and the tubular shaft of an adjacent one of the speed-increasing mechanisms.

3. The speed changer structure according to claim 2, wherein the arresting assembly of the speed-increasing mechanism comprises a disc mounted to an end of the tubular shaft and a stop piece arranged along a circumference of the disc to selectively stop rotation of the disc.

4. The speed changer structure according to claim 1, wherein the output frame comprises a front plate and a rear plate, and the bars are mounted between the front and rear plates in an equally angularly spaced manner, wherein the front plate is provided, at a center thereof, with a tubular output axle that corresponds to and is rotatably mounted to an end of the fixed shaft, and the rear plate is formed with a through hole through which an opposite end of the fixed shaft and the tubular shaft extend, the transmitting mechanism and the speed-increasing mechanism being disposed between the front and rear plates of the output frame.

5. The speed changer structure according to claim 4, wherein each of the bars of the output frame receives a bar sleeve to rotatably mount thereto, and the primary planetary gears of the transmitting mechanism and the planetary gears of the speed-increasing mechanism are sequentially and fixedly mounted to the bar sleeves, respectively.

6. The speed changer structure according to claim 1, wherein each of the bars of the output frame receives a bar sleeve to rotatably mount thereto, and the primary planetary gears of the transmitting mechanism and the planetary gears of the speed-increasing mechanism are sequentially and fixedly mounted to the bar sleeves, respectively.

7. The speed changer structure according to claim 1, wherein the arresting assembly of the speed-increasing mechanism comprises a disc mounted to an end of the tubular shaft and a stop piece arranged along a circumference of the disc to selectively stop rotation of the disc.

8. A speed changer structure, comprising:
a driving wheel, which is driven by a power source;
a transmitting mechanism, which comprises a fixed shaft, an output frame, and a toothed ring, wherein a primary sun gear is mounted by means of a one-way bearing to the fixed shaft, and the output frame is rotatably mounted to an end of the fixed shaft, the output frame comprising at least two bars that are parallel to the fixed shaft and jointly define a circle having a diameter that is smaller than an inside diameter of the toothed ring, each of the bars of the output frame being provided with a primary planetary gear rotatably mounted thereto and in mesh engagement with an inner circumference of the toothed ring, the toothed ring having an outer circumference in mesh engagement with a driving wheel;

a first speed-increasing mechanism, which comprises a first tubular shaft, a first sun gear, at least two first planetary gears, and a first arresting assembly, wherein the first tubular shaft is rotatably mounted to the fixed shaft, and the first sun gear is mounted by a one-way bearing to the first tubular shaft, the first sun gear having an outside diameter that is smaller than an outside diameter of the primary sun gear, the first planetary gears being respectively and rotatably mounted to the bars of the output frame, the first planetary gears being respectively combined with the primary planetary gears to be synchronously rotatable with each other, the first planetary gears being in mesh engagement with the first sun gear, the first arresting assembly being mounted to an opposite end of the first tubular shaft to selectively stop rotation of the first tubular shaft; and a second speed-increasing mechanism, which comprises a second tubular shaft, a second sun gear, at least two second planetary gears, and a second arresting assembly, wherein the second tubular shaft is rotatably mounted to the first tubular shaft, and the second sun gear is mounted to the second tubular shaft at one side that is opposite to the primary sun gear, the second sun gear having an outside diameter that is smaller than the outside diameter of the first sun gear, the second planetary gears being respectively and rotatably mounted to the bars of the output frame, the second planetary gears being combined with the primary planetary gears and corresponding ones of the first planetary gears to be synchronously rotatable with each other, the second planetary gears being in mesh engagement with the second sun gear, the second arresting assembly being mounted to an opposite end of the second tubular shaft to selectively stop rotation of the second tubular shaft;

wherein the driving wheel is driven by the power source and is in mesh engagement with the toothed ring of the transmitting mechanism to generate an output at the output frame, and an effect of increasing speed is achievable through the first and second arresting assemblies of the first and second speed-increasing mechanisms respectively fixing the first and second tubular shafts.

9. The speed changer structure according to claim 8, wherein the output frame comprises a front plate and a rear plate, and the bars are mounted between the front and rear plates in an equally angularly spaced manner, wherein the front plate is provided, at a center thereof, with a tubular output axle that corresponds to and is rotatably mounted to an end of the fixed shaft, and the rear plate is formed with a through hole through which an opposite end of the fixed shaft and the tubular shafts extend, the transmitting mechanism and the speed-increasing mechanisms being disposed between the front and rear plates of the output frame.

10. The speed changer structure according to claim 8, wherein each of the bars of the output frame receives a bar sleeve to rotatably mount thereto, and the primary planetary gears of the transmitting mechanism and the planetary gears of the speed-increasing mechanisms are sequentially and fixedly mounted to the bar sleeves, respectively.

11. The speed changer structure according to claim 9, wherein each of the bars of the output frame receives a bar sleeve to rotatably mount thereto, and the primary planetary gears of the transmitting mechanism and the planetary gears of the speed-increasing mechanisms are sequentially and fixedly mounted to the bar sleeves, respectively.

12. The speed changer structure according to claim 8, wherein the first and second arresting assemblies of the first and second speed-increasing mechanisms comprise a disc mounted to an end of the first and second tubular shafts and a stop piece arranged alone a circumference of the disc to selectively stop rotation of the disc.

* * * * *